Dec. 6, 1938.  N. N. WISWELL  2,139,143
COLLAPSING CONTAINER AND COLLAPSING DEVICE
Filed March 27, 1937  4 Sheets-Sheet 1
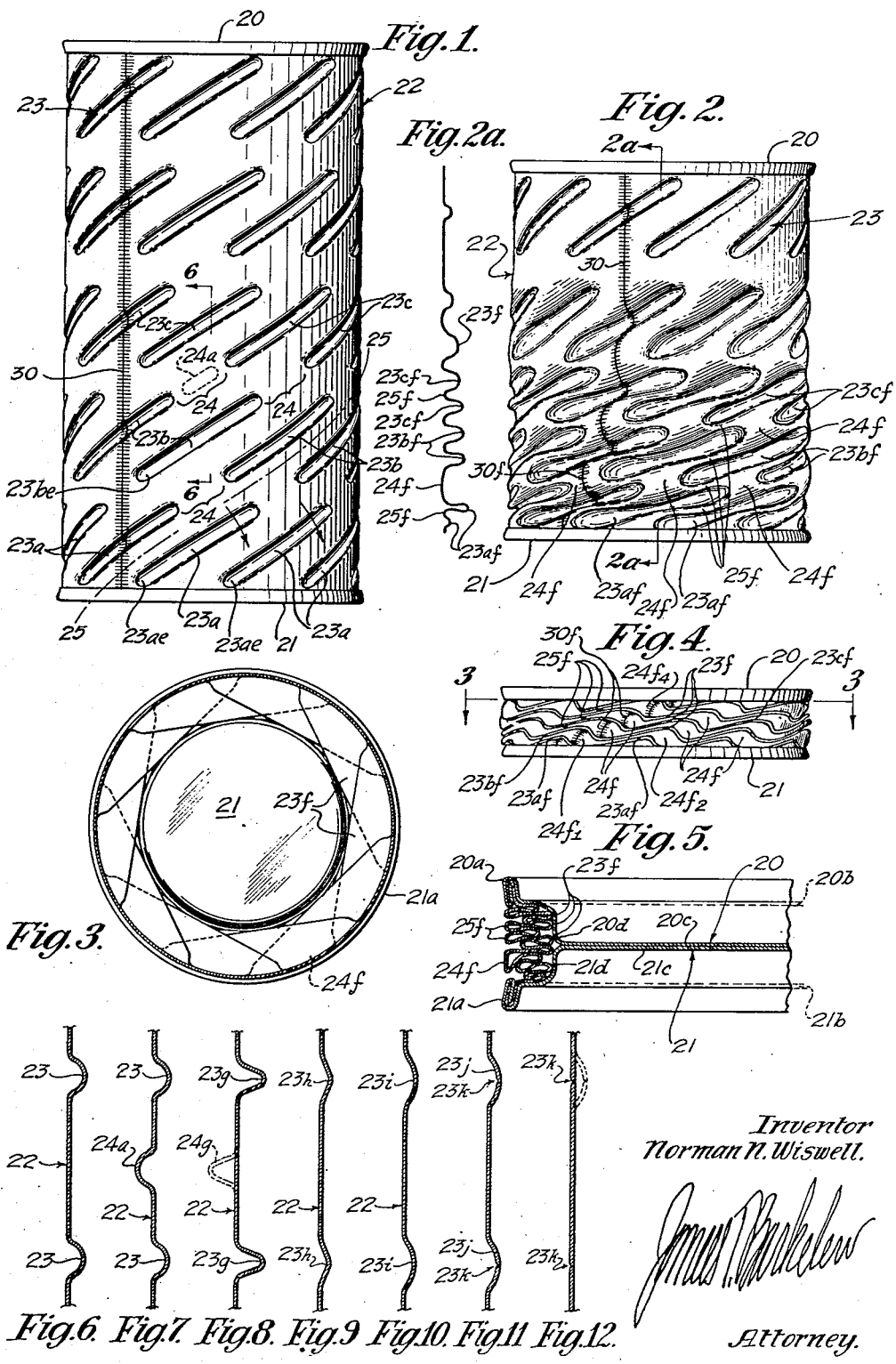
Inventor
Norman N. Wiswell.
Attorney.

Inventor
Norman N. Wiswell.
Attorney.

Dec. 6, 1938.  N. N. WISWELL  2,139,143
COLLAPSING CONTAINER AND COLLAPSING DEVICE
Filed March 27, 1937    4 Sheets—Sheet 3

Inventor
Norman N. Wiswell.

Attorney.

Dec. 6, 1938.   N. N. WISWELL   2,139,143
COLLAPSING CONTAINER AND COLLAPSING DEVICE
Filed March 27, 1937   4 Sheets-Sheet 4

Inventor
Norman N. Wiswell.

Attorney.

Patented Dec. 6, 1938

2,139,143

UNITED STATES PATENT OFFICE 2,139,143

COLLAPSING CONTAINER AND COLLAPSING DEVICE

Norman N. Wiswell, Los Angeles, Calif.

Application March 27, 1937, Serial No. 133,389

9 Claims. (Cl. 221—47.3)

This invention relates in general to dispensing liquids and semi-liquids from sealed containers; for instance, to dispensing oils, greases, pastes, creams, etc. from cylindrical containers, such as tin cans, aluminum and lead alloy tubes, tubular containers and other metal containers.

Among the objects of the present invention is to dispense or empty the contents of a sealed container without the contents being exposed to the atmosphere until the contents are discharged into the receiving receptacle or inlet.

Another object is to provide a method to more completely empty the contents of the container by avoiding the usual wall clingage, especially of thick or relatively high viscosity liquids.

Another object of the invention is to empty a container of its contents without depending on gravity.

Another object of the invention is to forcibly expel the contents of a container against an opposing force such as a receiving receptacle with a restricted opening, or under pressure, or a receiving receptacle on a higher level than the container.

Another object of the invention is to destroy the container when emptied, to an extent beyond repair for again holding liquids, and leave it in an unbulky form for easy disposal.

Another object of this invention is to provide a container which may be emptied more completely with close control of the discharge when used with a contemplated collapsing or dispensing device. This is particularly important in the case of certain relatively high priced lubricants, more especially the "extreme pressure" lubricants used for hypoid gears in modern automobiles. Over-filling of containers has been practiced by many oil refiners to assure the customer or purchaser of obtaining the full stipulated measure of lubricant which otherwise could not be obtained due to the interior wall clingage of the container and imperfect drainage. This procedure is not necessary with containers made as disclosed in this invention. The high percentage of containers holding "extreme pressure" lubricant is very important because of the fact that the various ingredients which are added to certain oils to give the lubricant the extreme pressure characteristics are not stable in the solution under certain atmospheric conditions, but tend to settle to the bottom of the container. By more completely expelling the contents of a container, the purchaser is assured of a proper amount of "extreme pressure" ingredient in the discharged lubricant.

Numerous other objects and advantages of the invention will be apparent as it is better understood from the following description.

This invention contemplates the idea of providing a system of creases, ridges or scoring in the side wall of the container, especially a round container such as a tin can, or a tubular container such as a tooth paste tube or shaving cream tubes etc.; and then by the use of a special collapsing tool, after the container has been provided with a discharge opening at one end, the container may be forcibly collapsed thereby expelling the contents.

By properly arranging and spacing the creases both longitudinally and transversely in the side wall of the container, the container is caused to uniformly fold as it is collapsed, by the application of pressure at the ends by means of the dispensing tool or "gun".

Various systems or patterns of creases may be used to initiate or start the uniform folding, and incidentally these creases stiffen the side wall of the container in the same manner that corrugations or ribs stiffen the sides of a bucket or like container, thus enabling the manufacturer of the container to use thinner and lighter weight material than otherwise could be used.

In the case of containers such as metal cans which are fabricated from sheet metal with a seam in the side wall, the system of creases is preferably placed diagonally, thereby causing each fold of the collapsed can, and especially each fold along the seam to come at an advanced position with relation to each preceding fold, thereby causing the seam to be not folded upon itself but beside itself, thus allowing a very complete collapse of the container and a very high percentage of ejection of the contents.

The dispensing or collapsing tool or gun may be operated by means of a jack screw or by means of a pneumatic or hydraulic cylinder or other power or pressure means. In the case of a gun using a pneumatic cylinder and piston or plunger as the collapsing force, it is desirable to provide special means to control the flow of the discharging container contents which might otherwise occur too fast due to the expanding pneumatic pressure.

The invention, as here contemplated, disclosed and claimed, includes the container itself, the co-operating combination of container and collapsing or expressing mechanism, and the collapsing or expressing mechanism insofar as it characteristically and functionally cooperates with the container.

In the following description and claims, except where it may be otherwise indicated by the text, I use the term "crease" in a broad and inclusive sense to include upstanding ridges or depressed grooves or troughs, and also scorings. As will appear in the following, it is only necessary that the container be so "creased" as to induce or cause initiation of the folding action of collapse, although it seems preferable that the "creases" be of such formation (e. g. ridges or grooves) that, in effect, the folding action of collapse is initiated in the container as manufactured.

With these preliminary observations, the invention will now be best understood from the following detailed description of specific illustrative embodiments reference for the purpose being had to the appended drawings in which:

Fig. 1 is a side elevation of a container of the "can" type, embodying the invention;

Fig. 2 is a side elevation of the container of Fig. 1, shown partially collapsed;

Fig. 2a is a fragmentary section taken on line 2a—2a in Fig. 2;

Fig. 3 is a plan section of the completely collapsed can, this section being taken as indicated by line 3—3 of Fig. 4;

Fig. 4 is a side elevation of the completely collapsed can;

Fig. 5 is a fragmentary central vertical section of the collapsed can;

Fig. 6 is an enlarged detail section taken as indicated by line 6—6 on Fig. 1;

Figure 13:
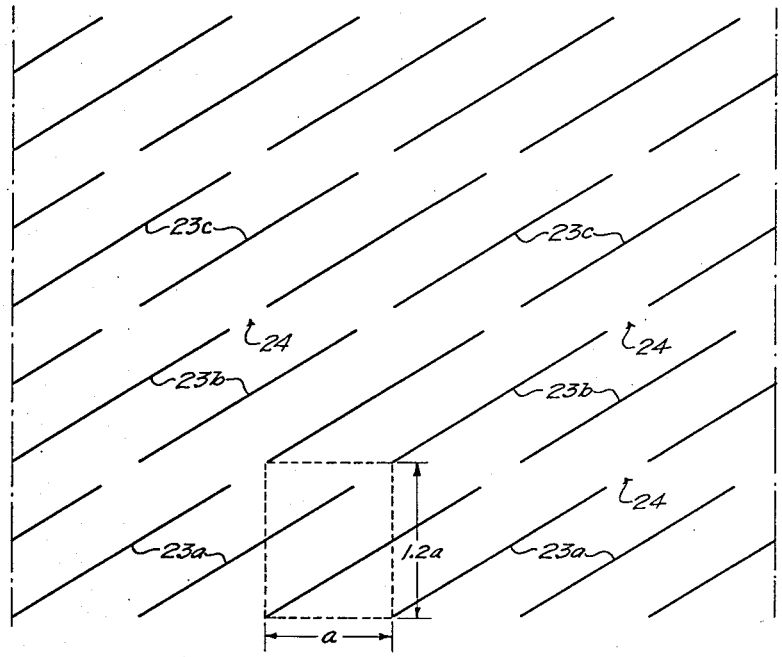
Figure 14:
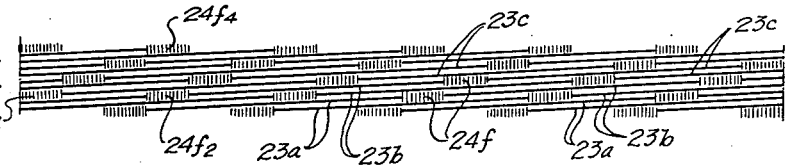
Figure 15:
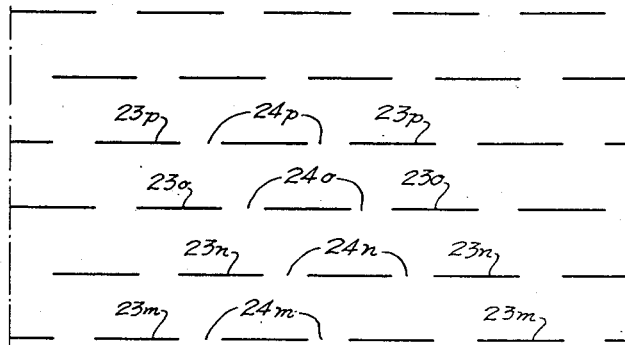
Figure 16:
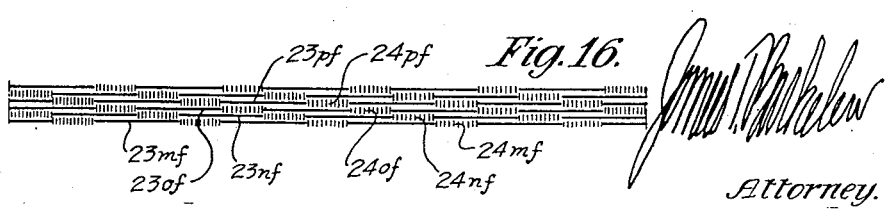
Figure 17:
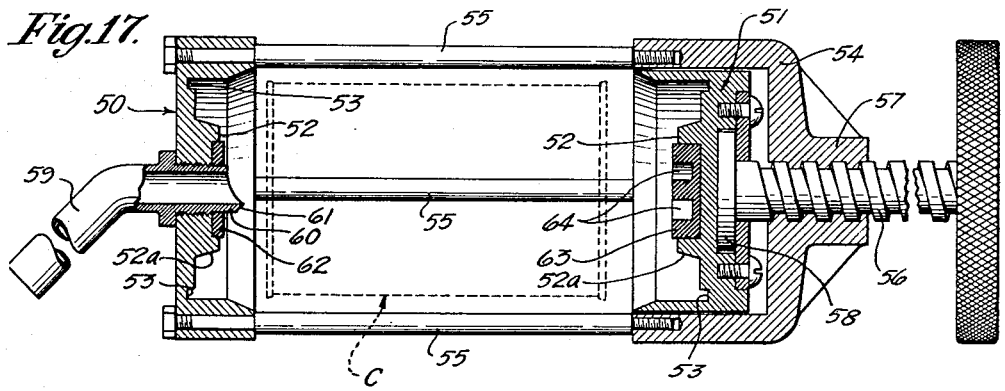
Figure 18:
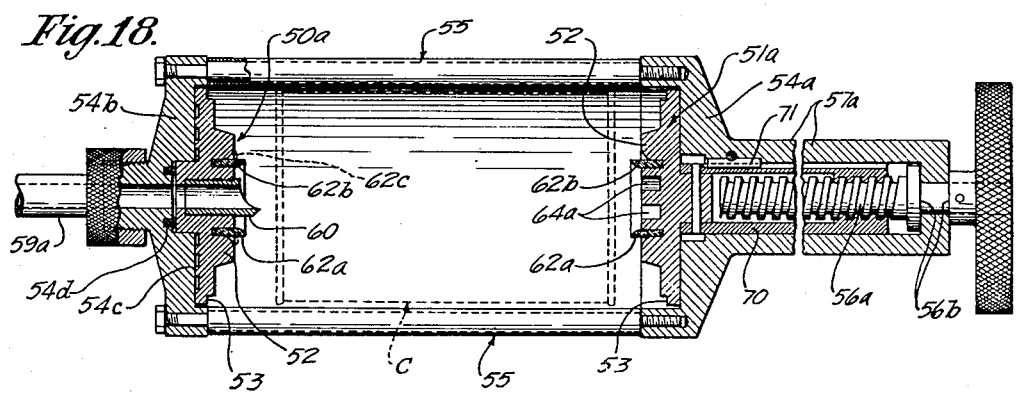
Figure 19:
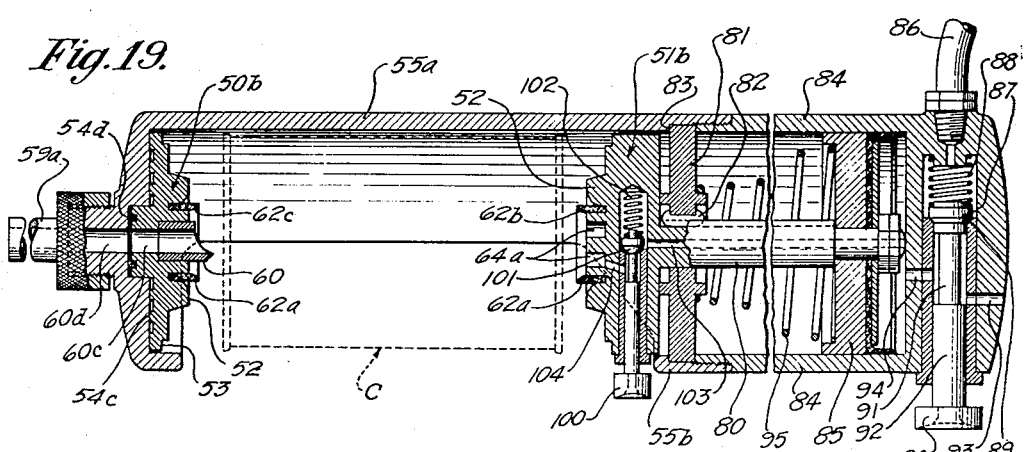
Figure 20:
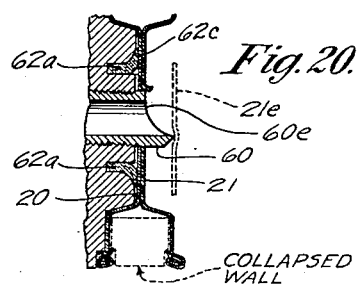
Figure 21:
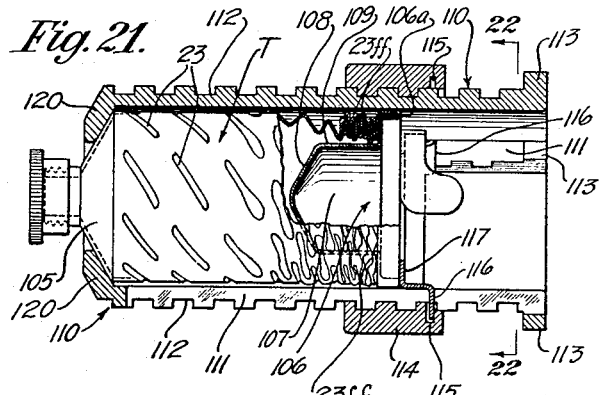
Figure 22:
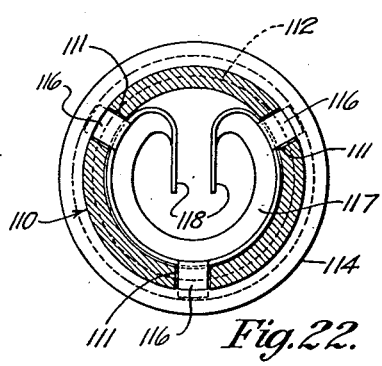
Figure 23:
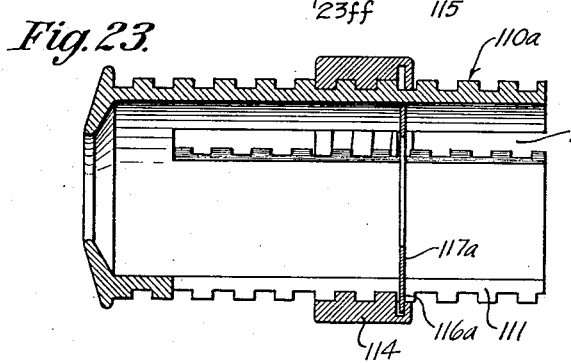
Figure 24:
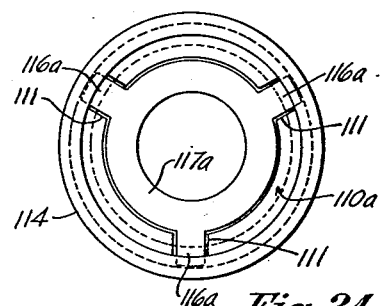
Figure 25:
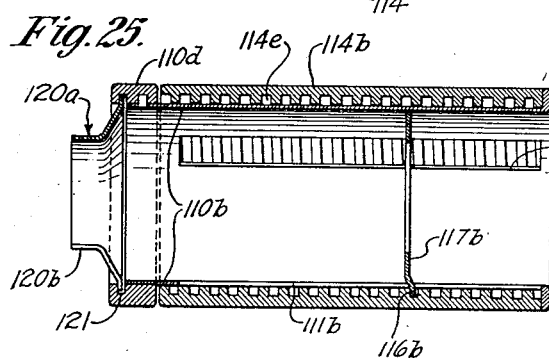
Figure 26:
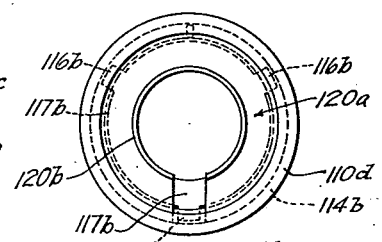
Figure 27:
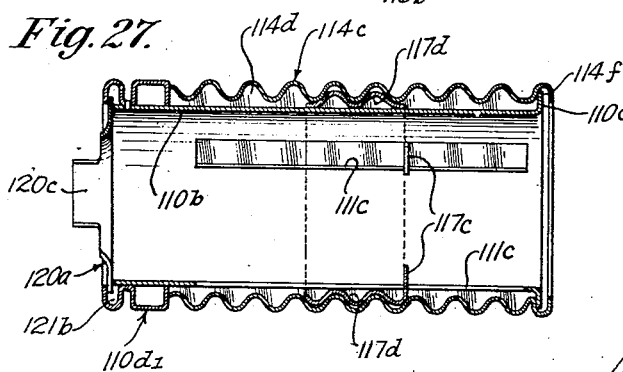
Figure 28:
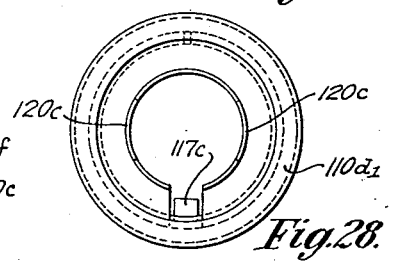

Figs. 7 to 12, inclusive, are similar enlarged detail sections showing a typical modified formation of the creases;

Fig. 13 is a diagrammatic developed illustration of such creasing pattern as shown in Fig. 1;

Fig. 14 is a similar diagram showing the collapsed pattern of the folds resulting from the creasing pattern of Fig. 13;

Fig. 15 is a developed diagram of the typical creasing pattern in which the creases extend directly around the container instead of diagonally or spirally;

Fig. 16 is a diagram showing the collapsed formation corresponding to Fig. 15;

Figs. 17, 18 and 19 are longitudinal central sections of typical formations of collapsing and expressing devices;

Fig. 20 is a detail section illustrating another position taken by the device of Fig. 18 in its operation;

Figs. 21, 23, 25 and 27 are, respectively, longitudinal central sections of other typical formations of collapsing and expressing devices, particularly applicable to containers of the tube type; Fig. 21 showing also such a container;

Fig. 22 is a section taken on line 22 on Fig. 21;

Figs. 24, 26 and 28 are, respectively, end views of the devices shown in Figs. 23, 25 and 27.

I shall first describe container structures and collapses typical of the invention. Figs. 1 to 5 show a container, similar to a common "tin" can, having top and bottom 20 and 21 joined by the usual rolled seam to the cylindric side wall 22. The top and bottom may be of the usual flat formation, or may be centrally sunk as will be described hereafter. The formation and collapsing action of the side wall will be first described.

As illustrated in these figures, the cylindric side wall 22 is provided with diagonal creases in the form of non-continuous diagonal or spiral grooves or indentations 23 formed in the otherwise cylindrical wall. As illustrated, the set of grooves designated 23a makes an overlapping circumferential course around the base of the can; the set designated 23b makes a similarly overlapping course around the can wall immediately above the set 23a; and the grooves of this second set bear certain relations to those of the first set as afterwards described. Similarly the third set 23c bears that same certain relation to the second set 23b; and so on to the top of the can. In the arrangement of the grooves it will be noted that there are ungrooved spaces (parts) of the can wall, designated 24, between respective grooves 23a and 23b. Were it not for these ungrooved parts, the respective grooves 23a, 23b, etc. would form a series of continuous spirals, which preferably is not desired. The advantageous function of the ungrooved parts will be better explained later.

When the side wall is subjected to longitudinal compression, the wall folds and collapses in the manner indicated in Figs. 2 to 5. Simultaneously the following actions take place.

(a) The grooved or indented parts of the wall start to form inwardly extending folds, as indicated at 23af, 23bf, etc. in Figs. 2 and 2a.

(b) Necessarily concomitant with this inward folding along the indentations, the parts of the wall along the lines between the indentations (such a line as indicated at 25 in Fig. 1), start to fold relatively outwardly; such outward folds being indicated at 25f in Figs. 2 and 2a. These folds 25f are necessarily the result of the inward folds 23af, etc., and will be called outward folds although, in the folding action, the finally resultant outward folds extend outwardly of the normal wall plane only a short distance.

(c) In collapsing, the indentations and resultant folds move toward the can end in the manner that can best be described as follows: The lowermost indentations and folds have a movement virtually of swinging downwardly, in the direction indicated by arrows in Fig. 1, around the indentation ends 23ae as centers. Likewise, and simultaneously, the next course of indentations 23b are swinging downwardly (and to the right in Figs. 1 and 2) by the swinging of the indentations 23a about their ends 23ae. Or, the downward swinging action of the lines of indentations and resultant folds may be viewed this way; that each spiral line of spaced indentations 23a, 23b, etc. is, as a whole, together with the resultant folds, swinging downwardly about the lower end 23ae of the corresponding indentation 23a.

However considered, the result of folding and collapse is to carry the right hand (upper) ends of all the indentations, and their folds, toward the right, and to overlap those right hand ends over the left hand ends of the indentation and fold next to the right. The amount of overlap is considered later. And also, the result of folding and collapse is to carry the indentations and folds of upper courses 23b, 23c, etc. toward the right and finally place the completed folds in certain overlapping relations to the folds below, and above.

(d) The un-indented parts 24, located on the spiral lines between the several indents 23a, 23b, 23c, etc., fold relatively outwardly to form a comparatively broad "hump" fold as indicated at 24f in the figures. These folds are also carried around to the right in swinging and folding down until, finally, they pattern somewhat as shown in Fig. 4. It will be noted that these hump folds do not finally lie one over the other, but rather in a staggered or spiral formation. In Fig. 4, starting with the lower hump fold 24f1, one counts to the fourth such hump fold marked 24f4 which lies approximately over the next such fold 24f2 in the lowermost line of folds. There are three folds to a group, so to speak; and likewise, in this particular design, one will notice that between the two hump folds 24f2 and 24f4 there lie three indented folds 23f. The folding pattern here is denoted "three-fold"; referred to later.

(e) Incidentally, when the inward and outward folds are formed, the indented folds "grow" both to greater width dimension and greater length dimension than the original indentations 23. The growth in width makes the final inward folds 23af, 23bf, etc. (generally, 23f) wider (radially) than the outward folds 25f; so that the completely folded wall lies mostly inward of the original cylindric plane of the wall. Figs. 3 and 5 show this clearly, and show how the wall may be folded and collapsed in such a manner that its outermost folds do not project materially beyond the circular limits of the top and bottom seams 20a and 21a.

From this last it will be readily understood that if the original creases 23 were beads (protrusions) instead of grooves (indentations); then the folds attendant these original formations would be relatively outward instead of inward, while the folds of the remainder of the can wall (those portions between these ridges) would be relatively inward instead of relatively outward; and then the width growth attendant these original formations would cause the final folds to extend mostly outward of the original wall cylinder.

I have noted also that the folds initiated by the original creases grow in length, over the original crease length. This means that the crease-initiated folds finally overlap each other somewhat further than would be indicated by consideration of Fig. 1 alone; and also that the hump-folds 24f are finally not as long as the original spaces 24.

The foregoing, I believe, gives a substantially accurate general description of a typical container formation and collapsing action. Below I will briefly and generally describe variant forms and their typical actions. However, before doing that I now point out further the reason for preferring spiral or diagonal formations over simple circular formations, and for preferring that the original creases (of whatever form they may be) shall be discontinuous.

First it may be noted that the spiral formation provides a container that is stronger in a longitudinal (vertical) direction, than would a simple circular formation of creases. And also, which is probably of most importance, the folding and collapsing action of the spiral formation carries the folds of a can seam 30 around so that the successive folds (see 30f in Fig. 4) do not lie one on another. These extra thick folds, lying one on the other, would impede and prevent complete collapse of the container and expression of its contents. It will of course be understood that the spiral formation may be either on a right-handed or left-handed spiral.

Next it will be noted that if the original creases (indentations in this illustration) were continuous, collapse of the container would necessarily involve a substantial linear compression of the metal lying along the inner edges of the resultant folds, and substantial linear stretching of the metal lying along outer edges of the resultant folds. The breaks 24, by inducing and allowing reverse folding (outwardly in this case) quite fully relieve the compression and extension strains, make the container much easier to collapse, and quite fully eliminate any danger of rupture that would otherwise be present.

The original creases have been so far described as indented grooves. From what has been said it will be readily recognized that they could be protruding beads, and that the action of folding will be the same in substance. In fact, in the form shown, the wall may be considered as made up of alternating indentations 23 and, relative, protrusions 25 (and 24), changing the relative forms or shapes of those relative indentations and protrusions does not change the mode of folding and collapse, although it may change the particulars of the folds as has been noted.

The original creasing, indentations or ridges, may be of any variant forms. Any pre-formation that starts or induces the folding will, in general, suffice. In Fig. 6 I show an enlarged section on line 6—6 of Fig. 1, showing the form of crease there illustrated. Fig. 7 shows how an intervening reversely projecting formation (in this case a protrusion 24a) may be formed in the normal can wall 22 in the spaces 24 between the creases 23. See also dotted line showing 24a in Fig. 1. Such formations 24a serve to more readily induce the reverse folding of the parts 24 into the hump folds 24f.

Figs. 8, 9 and 10 show variant sectional formations of the creases 23 and formation 24a; designated 23g and 24g in Fig. 8, and 23h and 23i in Figs. 9 and 10. Fig. 12 shows a simple scoring 23k which may be used instead of a formed groove or bead; the wall metal tends to bend and fold along such a scoring in the direction indicated in dotted lines. And Fig. 11 shows such a scoring 23k combined with an incipient groove or bead formation 23j.

The tops and bottoms of a container such as shown in Figs. 1–5, may either originally be flat (indicated at the dotted lines 20b and 21b in Fig. 5), or, preferably, originally be centrally sunk, as shown at 20c and 21c. If originally countersunk, the bounding rim walls 20d, 21d, are so placed as to allow substantially just room enough for the folded side wall, with a minimum clearance. And the countersunk heads 20c and 21c can then be pressed tightly together with no or little deformation of the heads necessary during the collapsing operation. If the heads are originally flat or only partly countersunk, then the compressing elements of the collapsing devices, hereinafter described, are so formed as to press the container heads inwardly to contact with each other over substantially the whole area inside the annulus occupied by the folded side wall.

Figs. 13 and 14 illustrate diagrammatically the general form shown in Figs. 1–5, and facilitate further understanding of certain controlling factors of design. In Fig. 13 the original formation is diagrammed; in Fig. 14 the collapsed condition is diagrammed. The diagonal lines in Fig. 13 represent the creases and are designated, as far as is necessary to this description, with the same indicia as in Fig. 1. In Fig. 14 the longer and substantially horizontal lines represent the folds that result from creases of Fig. 13, and the short cross-lined areas represent the hump-folds that lie between the longer folds. The lines 23a, etc. represent approximately, in length, the final lengths of the resultant folds, rather than the length of the initial creases as shown in Fig. 1.

In general I find it desirable, for an easily arranged pattern of creases, that the lower ends of the second course creases 23b, be approximately directly over the lower ends of first course creases 23a. For a "three-fold" pattern the approximate proportional dimensions and resulting angle are shown in Fig. 13. These proportions are only approximate; particulars may depend on the pliability of the metal, its thickness, the form of the creases, etc. However, in general, I find that control of the design as to two-fold, three-fold, four-fold, etc. depends primarily on the relations of the dimensions given. Generally, by increasing the height dimension with relation to the horizontal spacing $a$, and correspondingly increasing the noted angle, the number of folds between successive superposed hump folds is decreased; and vice versa.

Figs. 15 and 16 show a typical pattern of creases that may be used without any spiral or diagonal; a pattern in which the creases proceed directly around the container. Here, the creases 23m, 23n, etc. of the respective circular superimposed courses, are separated by the uncreased spaces 24m, 24n, etc., which uncreased parts finally result in the hump-folds 24f, as before. When folded and collapsed, the folds lie in a formation much like those before described, except that they lie in horizontal lines around the collapsed can. The collapsed formation, corresponding to the original pattern of Fig. 15, is shown in Fig. 16; folds corresponding to the original formations being indicated by the same references with the added suffix f. This particular pattern gives a three-fold arrangement when collapsed, as is readily seen from Fig. 16. Other original patterns, not necessary to detail, will result in other fold-multiples.

To collapse such containers as have been described, expressor mechanisms such as those of Fig. 17 and following may be used. Fig. 17 shows an expressor having two relative movable heads 50 and 51 which are of such configurations as to engage opposite can heads of the form shown in full lines in Fig. 5; or to engage flat can heads and during the operation of expressing the can contents, force those can heads more or less into that configuration of Fig. 5. Thus, these two expressor heads have central bosses 52 to engage in the countersunk portions of the can head and peripheral channels 53 to take the end heads 20a and 21a of the can. One of these heads, say 50, may be a relatively non-moving part of the mechanism; the other, 51, is relatively moved in a head cage 54 which is physically connected with head 50 by some suitable element as by connecting rods 55. The can is placed in a position such as shown at C in dotted lines. In Fig. 17 the movable head 51 is moved by a screw 56 which is threaded through the boss 57 of head cage 54; the screw having swivel connection 58 with the head 51 to allow the head and screw to be rotatively free of each other. It will be understood from the preceding description of the can that, on collapse, the two can heads rotate relative to each other and that therefore the heads of the expressor mechanism are preferably left free to correspondingly relatively rotate.

Head 50 carries a tube or nozzle 59 through which the can contents are to be forced out; and an annular or tubular can perforator 60 which may be formed as a part of that nozzle projects its cutting end 61 inside the head 50. Surrounding the perforator 60 is a flat rubber or similar washer 62, countersunk into the face of boss 52 of head 50.

Head 51 also carries a central rubber washer 63, this washer having an annular channel 64 in its inner face for a purpose which will be shortly understood.

When a can, such as that shown in Figs. 1 to 5, is placed in this mechanism and the head 51 run up, that head 51 will first engage the can head. Assuming the can head to be initially countersunk, head 51 will engage the can head fully, washer 63 being compressed so that its face is flush with the face of boss 52. Further movement of head 51 will force the opposite can head against perforator 60 and cause that perforator to puncture the can head. The perforated can head then moves forward (to the left in Fig. 17) around the perforator and the can head then fully engages the expressor head 50, assuming the can head to be initially countersunk. The washer 62 is compressed to the face of boss 52, and the pressure contact of the washer with the can head seals the perforation opening around the perforator.

If the can heads have not been initially countersunk, the action so far explained is the same except that initially only the central parts of the can heads will engage the central bosses of heads 50 and 51. The pressure applied to the can between heads 50 and 51 will, at some time during the operation of expression, force the can heads more or less into the countersunk form corresponding to the shapes of heads 50 and 51. In general, then, the expression operation that is here explained is the same whether the can heads are initially countersunk or not; they in any case become countersunk to substantially the form desired for maximum expression of the contents.

Further advance of head 51 causes folding and collapse of the can, and expression of the contents under pressure through nozzle 59. As the can heads are finally forced together the can folds are forced into a minimum bulk, flatly upon each other and with minimum interstitial spaces in the folds (see Fig. 5). The rim walls 20d and 21d of the can heads, supported by the peripheral surfaces 52a of the bosses 52 are jammed against the innermost surfaces of the folds, and the central countersunk parts of the two can heads are forced together. When they are finally forced together, the perforator 60, whose inner end necessarily projects into the can interior through the perforated head, finally perforates the other can head by passing through it and into the annular channel 64 of washer 63. That channel is intended to be of such size and so placed, in the compressed washer, as to just snugly take the end of the perforator and whatever lip of metal that may be turned into the channel around the edges of the perforation and around the perforator. Consequently, although the perforator thus passes on through the second can head to allow the two can heads finally to come flatly together, no appreciable amount of the contents is lost through the second head perforation because washer 63 prevents it. Further details relating to the expression of the last part of the can contents through the perforator after it has perforated the second can head will be explained later.

It is believed unnecessary now to point out in detail how the described can, and its method of collapse, accomplish the stated objects of the invention; the facts of such accomplishment will have been gathered from the preceding descriptions.

Fig. 18 shows a similar expressor mechanism. Here the head 50a is relatively rotatable in a head cage 54b; bearing surfaces being provided at 54c, and a sealing washer or packing at 54d. The perforator 60 is mounted in head 50a, and the discharge nozzle 59a connected to the head cage 54b. The other head 51a is mounted on and carried by a sleeve 70 that is splined at 71 into the boss 57a of head cage 54a. The operating screw 56a is held longitudinally stationary, at 56b, in the boss 57a and screw-threadedly engages the sleeve 70. The heads 50a and 51a of this form have cylindric rubber washers 62a, instead of the flat ones before described. These washers, with flared inner surfaces at their ends as at 62b, tend to flare further by expansion when the can heads engage therein; see the dotted lines in Fig. 18 at 62c.

Head 51a has its annular channel 64a, for finally receiving the perforator, in the face of the head itself rather than in the washer as in Fig. 17. Otherwise, the heads 50a and 51a are similar to those of Fig. 17; having the central boss 52 and the peripheral channel 53.

Fig. 20 shows the relative positions of the can heads and the immediately co-operating parts of Fig. 18, at the time when the can is fully collapsed. Just before reaching this position, before and during the time the second head (marked 21 in Fig. 20) is perforated, the two heads 20 and 21 are still somewhat separated. Such a position of head 21 is illustrated in dotted lines at 21e. In this position, and until the head 21 reaches its final position against head 20 there still remains in the can some content that must be forced out through the perforator, although the perforator end is then passing through head 21. Provision for expressing this last part of the content is made by bevelling or notching the end of the perforator, as shown at 60e, in such a manner that the open perforator end is at no time closed by the can head 21 as it comes against it. The particulars described in this paragraph apply equally well to Fig. 17 and to Fig. 19 now to be described.

Fig. 19 shows a pneumatically operated type of expressor mechanism. Here the left hand head and head cage structure is the same as in Fig. 18 and the same numerals are applied. The connection between the two head cages is shown as a semi-cylinder 55a. The right hand head 51b has the same inner face formation and washer as the head 51a of Fig. 18, and the same numerals are applied.

This right hand head 51b is carried on the end of a piston rod 80 which reciprocates through a plate 81, into which it is splined at 82 to hold it from rotation. Plate 81 is held between a shoulder 83, of the connecting member 55a, and the end of a power cylinder 84 that is screw-threaded into member 55a. The right hand end of member 55a is fully cylindric, as at 55b.

Power cylinder 84 has in it a piston 85 mounted on rod 80. Fluid pressure for operation is supplied through pipe 86 under control of valve 87 which is normally held in its seat 89 by spring 88 and is opened by pressing the thumb piece 90. The valve stem has a reduced part 91 and an enlarged part 92. It will be seen that when the valve is pressed in, the enlarged stem part 92 will close exhaust port 93 and lift valve 87 off its seat to communicate fluid pressure to cylinder port 94 to drive piston 85 to the left. This drives head 51b to the left, collapsing the can C and expressing its contents as before described. At any stage of can collapse and expression of the contents the action may be positively stopped by releasing valve 87, when the pressure in cylinder 84 will be relieved through exhaust port 93 and the piston returned to its position shown, by spring 95.

As noted before, it is in some instances especially desirable to express from the container, and to deliver into a receptacle (e. g. transmission case) as nearly all the can contents as possible. The described collapse of the can expresses from it very nearly all the contents; but the tubular perforator 60 and the connected passages and the discharge nozzle or tube 59 will still contain some of the contents. In this pneumatic form of expressor device I provide means for delivering the contents from all such spaces and passages.

When a can is fully collapsed, the perforator 60 has perforated both can heads and entered the annular channel 64a, the washer 62b sealing off any leakage around the perforator. At this stage, and while fluid pressure is still holding piston 85 to the left, the operator pushes the valve button 100 of the valve 101 that is normally seated by spring 102. A port 103 leads pressure to valve 101, through piston rod 80 from the interior of cylinder 84 behind piston 85. When valve 101 is opened this fluid pressure is communicated to port 104 and through it to the annular channel 64a. This annular channel fits perforator 60 snugly but not tightly; so the fluid pressure in channel 64a finds its way into the interior of the perforator and blows out whatever can contents there may be in the perforator, the connecting passages 60c and 60d, and nozzle or tube 59a.

Figs. 21 and 22 show the invention applied to the type of soft metal tube commonly used for creams, pastes, etc. In Fig. 21 there is shown a tube T provided with the same type of diagonal creases 23 as before described. The tube is shown as partly collapsed. Such tubes commonly have heads 105 of conical form. I equip my tube with a bottom 106, which bottom typically will have a peripheral portion 106a that joins with the bottom edge of the creased side wall; and will have an inwardly countersunk portion 107 with a conical end 108 to fit into the conical cap 105 when the tube is fully collapsed, and with a peripheral wall 109 that allows just enough space outside it to accommodate the finally folded side wall, as shown at 23ff.

To foldingly collapse such a soft metal tube it is only necessary to exert pressure upon its two ends; but with so soft a tube it may usually be desirable also to give the side wall some supporting guidance.

In Figs. 21 and 22 the expressor device has a cylindric body 110 provided with several longitudinal slots 111 and with an external thread 112. Slots 111 are open ended at the bottom end of the body, which end is provided with a ring flange 113 to prevent that end from spreading. An internally threaded ring 114 runs on the body threads, and this ring has an interior annular groove 115 that takes the tabs 116 that project through body slots 111 from a split ring 117 which lies within body 110. This split 117 forms the member which presses directly against the tube bottom 106. The split ring has finger tabs 118 which, being squeezed between the fingers, collapse the ring 117 sufficiently to remove its tabs 116 from engagement with ring 114, when the ring 117 may be removed from ring 114 and from the body so that a tube T may be removed or inserted. The head or top end of body 110 has a flange 120 against which the tube cap 105 is pressed. Operation of this device to collapse the tube T and express its contents will be understood from what has been said.

Figs. 23 and 24 show a similar form of device. Here the body 110a has the same slots 111, but, not being provided with the ring flange 113, the operating ring 114 can be run off the open end of the body, and the tube engaging ring 117a with its tabs 116a can remain in permanent engagement with ring 114 and need not be split as in Fig. 21.

Figs. 25 and 26 show a form wherein the body is formed of a tube 110b of thin metal, with a flange 110c on the bottom end, and a ring 110d set in any suitable manner on the upper end. This ring 110d has an internal annular groove 121 adapted to take a split ring cap 120a which may be compressed to free it from the ring 110d. Surrounding the tube 110b between ring 110d and flange 110c is a rotatable sleeve 114b, internally threaded at 114e. A ring 117b has tabs 116b that project through slots 111b in tube 110b to engage the threads of sleeve 114b. It will be readily understood how a tube T may be inserted or removed by removing the cap ring 120a; and how a tube T may be compressed by rotating the sleeve 114b.

Figs. 27 and 28 show a modification of this last form. Here the tube 110b with its end flange 110c are substantially the same; and ring cap 120a is substantially the same except that instead of having the nearly cylindric neck (120b as shown in Figs. 25 and 26) it merely has two tabs 120c that may be squeezed between the fingers to contact the ring cap 120a.

However, in Figs. 27 and 28, the ring 110d1 is made up of pressed sheet metal; as is shown in F'g. 27 the annular groove 121b is formed by beading the metal. An external rotatable sleeve 114c is also made of sheet metal with the threads 114d, formed in it, instead of cut as at 114e in Fig. 25. And the member which engages the bottom of the tube T is, in these Figs. 27 and 28, formed as tabs 117c which project, through slots 111c in tube 110b, from a threaded sheet metal ring 117d that rides longitudinally on tube 110b and screwthreadedly engages the sleeve 114c. The end of sleeve 114c has a beaded channel 114f that takes the flange 110c on the end of tube 110b to hold sleeve 114c against longitudinal movement.

The foregoing descriptions have covered several variants of the container and of expressor mechanism for the purpose of indicating the breadth of variations within the invention, but with no intention of exhaustively specifying all the possible variations. The invention itself is not limited to such details as have been described except to the extent that is positively expressed in the following claims.

I claim:

1. A container having a foldable side wall of readily bendable and collapsible material creased over substantially the entire length of the container with a plurality of substantially parallel fold initiating creases extending around the side wall, said creases having a plurality of intermissions which occur at several points about the circumference of the wall, all in such manner that the container may be substantially completely collapsed by endwise pressure, with the side wall material between said parallel creases, and also at the intermissions in each crease, bending reversely to the direction of deformation of said fold initiating creases.

2. A container having a foldable side wall creased with a plurality of substantially parallel fold initiating creases extending intermittently and spirally around the side wall.

3. A container having a foldable side wall of readily bendable and collapsible material creased over substantially the entire length of the container with a plurality of substantially parallel fold initiating creases extending around the side wall, said creases having a plurality of intermissions which occur at regularly spaced intervals at several points about the circumference of the wall, all in such manner that the container may be substantially completely collapsed by endwise pressure, with the side wall material between said parallel creases, and also at the intermissions in each crease, bending reversely to the direction of deformation of said fold initiating creases.

4. A container having a foldable side wall creased with a plurality of substantially parallel fold initiating creases extending intermittently and spirally around the side wall, intermissions in the several creases occurring at regularly spaced intervals at several points in the circumference of the wall.

5. A container having a foldable side wall creased with a plurality of substantially parallel fold initiating creases extending intermittently around the side wall, intermissions in the several creases occurring at regularly spaced intervals at several points in the circumference of the wall, and the points of intermission of the several creases being so relatively arranged as to lie in circumferentially spaced relation one to another when the side wall is folded.

6. A container having a foldable side wall creased with a plurality of substantially parallel fold initiating creases extending intermittently and spirally around the side wall, intermissions in the several creases occurring at regularly spaced intervals at several points in the circumference of the wall, and the points of intermission of the several creases being so relatively arranged as to lie in circumferentially spaced relation one to another when the side wall is folded.

7. In devices for collapsing and expressing the contents from a container of the type described, a frame, a pair of opposed container engaging heads mounted in said frame, one of said heads being relatively longitudinally movable to and from the other, means forcibly to move said movable head toward the other head, said last mentioned means being fluid pressure actuated and comprising a cylinder and pitson, a piston rod carrying said movable head, and a controlling valve; a perforator mounted on the other of said heads and projecting from it toward the movable head, the movable head having a recess adapted to take the projecting perforator when the two heads approach each other, and valve controlled means for admitting fluid pressure to said recess.

8. In devices for collapsing and expressing the contents from a container of the type described, a frame, a pair of opposed container engaging heads mounted in said frame, one of said heads being relatively longitudinally movable to and from the other, means forcibly to move said movable head toward the other head, said last mentioned means being fluid pressure actuated and comprising a cylinder and piston, a piston rod carrying said movable head, and a controlling valve; a perforator mounted on the other of said heads and projecting from it toward the movable head, the movable head having a recess adapted to take the projecting perforator when the two heads approach each other, the piston rod and head having passages leading from the piston end of the rod to said recess, and valve means carried by the head and controlling delivery of fluid pressure to said recess through said passages.

9. A container having a foldable side wall creased with a plurality of substantially parallel fold initiating creases extending intermittently around the side wall, and the points of intermission of the several creases being so relatively arranged as to lie in circumferentially spaced relation one to another when the side wall is folded.

NORMAN N. WISWELL.